US012671016B2

(12) United States Patent
Hartl

(10) Patent No.: US 12,671,016 B2
(45) Date of Patent: Jun. 30, 2026

(54) ELECTRICAL FEEDTHROUGH ASSEMBLY

(71) Applicant: SCHOTT AG, Mainz (DE)

(72) Inventor: Helmut Hartl, Klosterneuburg (AT)

(73) Assignee: SCHOTT AG, Mainz (DE)

( * ) Notice: Subject to any disclaimer, the term of this patent is extended or adjusted under 35 U.S.C. 154(b) by 214 days.

(21) Appl. No.: 18/771,509

(22) Filed: Jul. 12, 2024

(65) Prior Publication Data

US 2025/0095884 A1 Mar. 20, 2025

(30) Foreign Application Priority Data

Sep. 19, 2023 (EP) .................................... 23198286

(51) Int. Cl.
*H01B 17/30* (2006.01)

(52) U.S. Cl.
CPC ................................. *H01B 17/303* (2013.01)

(58) Field of Classification Search
None
See application file for complete search history.

(56) References Cited

U.S. PATENT DOCUMENTS 3,435,128 A * 3/1969 Dorwald .................. H02G 3/22 174/18
3,721,948 A * 3/1973 Brandt ................. H01B 17/305 439/736
4,841,101 A * 6/1989 Pollock ................ H01B 17/305 403/30
4,964,788 A * 10/1990 Itameri-Kinter ....... H01R 13/74 439/926
5,223,672 A * 6/1993 Pinneo .................. H10W 95/00 228/113
5,817,984 A * 10/1998 Taylor .................. A61N 1/3754 501/67
6,628,024 B1 * 9/2003 Mirmobin .............. H02K 5/225 310/71
6,812,404 B1 * 11/2004 Martinez ............. A61N 1/3754 174/50.62

(Continued)

FOREIGN PATENT DOCUMENTS

DE 112019002790 T5 3/2021
EP 2309128 A1 4/2011

(Continued)

*Primary Examiner* — Krystal Robinson
(74) *Attorney, Agent, or Firm* — LUCAS & MERCANTI, LLP

(57) ABSTRACT

An electrical feedthrough assembly suitable for an e-compressor is provided which includes a base body which attaches to a housing and has an electrical feedthrough. The electrical feed-through has an opening in the base body for a conductor fed through the opening and embedded in a fixation material which seals the opening of the electrical feed-through. The assembly further includes an insulation element adhesively affixed to the base body. The insulation element has an insulation section which includes a conductor opening through which the conductor is fed. The insulation element is configured and arranged such that a contact portion of the insulation section contacts the adhesive material. For each insulation section, an air channel is formed, wherein a top wall of the air channel is formed by the insulation element, and the air channel surrounds the contact portion of the insulation section.

18 Claims, 3 Drawing Sheets

(56) References Cited

U.S. PATENT DOCUMENTS

| | | | | | |
|---|---|---|---|---|---|
| 6,841,731 | B1 * | 1/2005 | Zanello | H01J 5/36 | 174/50.56 |
| 6,844,502 | B2 * | 1/2005 | Deng | H01B 17/30 | 174/153 R |
| 11,744,518 | B2 * | 9/2023 | Ruben | H05K 3/4038 | 174/50.52 |
| 2002/0148629 | A1 * | 10/2002 | Honkomp | H01B 17/303 | 174/50.52 |
| 2005/0194174 | A1 * | 9/2005 | Hipwell | G11B 33/12 | 174/262 |
| 2010/0202096 | A1 * | 8/2010 | Iyer | H01G 4/236 | 361/302 |
| 2013/0215553 | A1 * | 8/2013 | Iyer | A61N 1/3754 | 361/302 |
| 2014/0238741 | A1 * | 8/2014 | Willing | H01R 43/20 | 174/84 R |
| 2014/0360748 | A1 * | 12/2014 | Iyer | H05K 13/00 | 174/50.53 |
| 2018/0102614 | A1 * | 4/2018 | Hetrick | H01R 13/74 | |
| 2020/0203881 | A1 * | 6/2020 | Marzano | H01G 4/232 | |
| 2021/0234300 | A1 | 7/2021 | Fukushima et al. | | |
| 2021/0280934 | A1 * | 9/2021 | Hartl | H01M 50/15 | |
| 2022/0354012 | A1 * | 11/2022 | Maegawa | F04B 39/121 | |
| 2023/0335941 | A1 | 10/2023 | Maegawa et al. | | |
| 2025/0336573 | A1 * | 10/2025 | Hartl | H01B 17/305 | |
| 2026/0074095 | A1 * | 3/2026 | Hartl | H01B 17/301 | |
| 2026/0075735 | A1 * | 3/2026 | Hartl | H01B 17/305 | |

FOREIGN PATENT DOCUMENTS

| | | | | |
|---|---|---|---|---|
| EP | 4530467 | A1 * | 4/2025 | H01R 13/521 |
| WO | 2012/041472 | A1 | 4/2012 | |
| WO | 2022/259597 | A1 | 12/2022 | |

* cited by examiner

ELECTRICAL FEEDTHROUGH ASSEMBLY

CROSS-REFERENCE TO RELATED APPLICATIONS

This application claims the benefit of priority from European Patent Application No. 23198286.9, filed Sep. 19, 2023, the disclosure of which is incorporated herein by reference.

BACKGROUND OF THE INVENTION

The invention relates to an electrical feedthrough assembly which is preferably configured as e-compressor terminal, and which comprises at least one electrical feedthrough, each electrical feedthrough comprising an opening in the base body for a conductor which is fed through the opening and embedded in a fixation material which seals the opening of the electrical feedthrough, wherein the electrical feedthrough assembly further comprises at least one insulation element being affixed to the base body by means of an adhesive material.

Housings for electronic components usually require a plurality of electrical feedthroughs in order to enable electrical connections from outside to the inner part of the housing, which accommodates e.g. parts of an electronic compressor in the housing. The electrical feedthroughs should be fluid tight or even hermetic in order to protect the components inside the housing from the environment and/or to contain gases or fluids in the housing. In order to provide such fluid-tight or hermetic feedthroughs for an electric conductor arranged in an opening of the housing, glass-to-metal seals may be used. A fixation material, for example a glass material, is used to seal the opening and to hold the conductor within the opening. The fixation material also provides an electrical insulation between the conductor and the housing.

To provide additional electrical insulation between the housing and the conductor and, if more than one conductor is present between the conductors, it is known to arrange an additional insulation element on the electrical feedthrough. The insulation element at least partially surrounds the conductor and enlarges a so-called creepage distance between a conductor and the housing and/or between two conductors. The insulation element for extending the creepage distance may be, for example, an insulating rubber or plastic sleeve or cylinder, which at least partially surrounds a conductor.

WO2022259597A1 describes an airtight terminal having a metal base body which has at least one opening. A connecting lead is inserted through the opening and a fixation material seals said opening. The terminal further comprises an insulating cylinder having at least one peripheral groove on the outer periphery wall. The insulating cylinder is made from a heat-resistant and oil/refrigerant-resistant elastic rubber or plastic material and which is airtightly adhered to the fixation material or the base body via an adhesive layer. Suitable plastic materials for the insulating cylinder include PBT (polybutylene terephthalate), PPS (polyphenylene sulfide), or PEEK (polyetheretherketone). Suitable rubber materials include HNBR (hydrogenated nitrile rubber) or EPDM (ethylene-propylene-diene rubber). For bonding insulating cylinders made from PPS and EPDM an epoxy adhesive is used.

However, it is difficult to reliably apply the correct amount of adhesive such that the insulating element is securely attached without any bubbles or gaps in the glue and without excess glue overflowing onto other parts of the feedthrough. Overflowing glue may block parts of the feedthrough assembly required for mounting to a housing or may cover parts of the conductor which are intended to make electrical contact, for example with a connector. Further, any gaps or bubbles may negatively affect the insulating properties of the insulator and may allow dirt or water to damage the connection.

OBJECT AND SUMMARY OF THE INVENTION

It is an object of the present invention to provide a feedthrough assembly having at least one sealed conductor and an additional insulation element for extending of a creeping distance between the conductor and a base body of the feedthrough, which is easy to manufacture and allows for a reliable connection of the insulation element.

An electrical feedthrough assembly is provided which comprises a base body configured for attachment to a housing and comprising one or more electrical feedthroughs. Each electrical feedthrough comprises an opening in the base body for a conductor which is fed through the opening and embedded in a fixation material which seals the opening of the electrical feedthrough. The electrical feedthrough assembly further comprises at least one insulation element being affixed to the base body by means of an adhesive material, wherein the at least one insulation element comprises at least one insulation section, wherein each electrical feedthrough has an assigned insulation section. Each insulation section has a conductor opening through which the respective conductor is fed, wherein the insulation element is configured and arranged such that a contact portion of each insulation section is in contact with the adhesive material, and wherein for each insulation section an air channel is formed. A top wall of the air channel is formed by the insulation element, and the air channel completely surrounds the contact portion of the respective insulation section.

The insulation element in combination with the adhesive material serves as electrical insulation for the conductors of the electrical feedthrough. This additional electrical insulation increases an electrical insulation distance or creeping distance between a conductor and the base body and/or between two conductors. Thus, the insulation element contributes to reduce the risk of short circuits, especially in case of wet or humid environments. In such environments, a water layer and/or dirt layer or the like might deposit on the surfaces of the feedthrough assembly, in particular on a surface of the fixation material insulating a conductor from the base body. Such a water film wetting the materials of the feedthrough assembly can in particular occur easily in an e-compressor with the feedthrough assembly configured as an e-compressor terminal. This is because the e-compressor has a very low temperature e.g. of lower than e.g. 5° C. or even negative temperatures, whereas the ambient temperature e.g. in the summer time might be higher than 20° C. In such a case, a water film may form due to condensation. By additionally insulating the conductor from the material of the base body and thus from a housing of a device comprising the feedthrough assembly, for example in e-compressor applications, short circuits due to conductive water and/or dirt films can be prevented.

The air channel forms a connection from a surface of the adhesive material to the surrounding environment and thus allows any gas, such as air, which may be trapped within the adhesive to escape. This reduces the risk that gaps such as air bubbles remain within the adhesive. As the material of the insulation element as well as the adhesive material serve as an electrical insulation of the conductor, any gap would weaken the insulating properties and must be avoided.

Preferably, a pocket for the adhesive material is defined by the base body and the fixation material, wherein the opening is located within said pocket, and a contact portion of the insulation sections comprises a projection which extends into the pocket such that a gap between a side wall of the pocket and a side wall of the projection is formed. The contact portion and the adhesive may be arranged such that the adhesive is only in direct contact with the contact portion and is not in contact with side walls of the projection. Alternatively, the adhesive material is arranged such that the adhesive material at least partially fills said gap. Preferably, the projection extends into the pocket for a distance in the range of from 0.05 mm to 0.5 mm. For example, preferably in the range of from 0.1 mm to 0.2 mm.

Such an arrangement is advantageous as the pocket provides a space or reservoir to receive the adhesive material. In addition to the air gap, the pocket can in particular receive any excess adhesive material which is not required to connect the contact portion of the insulation section to the base body and/or the fixation material. Any overflow of the adhesive material to other sections of the base body, which may e.g. serve as sealing surfaces, is thus avoided. The provided reservoir may compensate for tolerances in the dosing of the adhesive material.

Preferably, the pocket and/or the projection has slanted side walls. Slanted side walls of the pocket reduce the risk of gaps within the adhesive or trapping air bubbles within the adhesive material.

In embodiments where the pocket has slanted side walls it is preferred that the projection of the insulating section having the contact portion has a matching slanted side wall shape. While the shape of the contact portion is preferably the same shape as the pocket, the dimensions of the contact portions are preferably chosen to be smaller than the dimensions of the pocket so that there is always a gap present between a side wall of the pocket and a side wall of the projection of the insulating section. This gap ensures that no seal may be created between the side wall and the insulation section such that any trapped air within the adhesive can escape.

The shape of the rubber insulation element is preferably chosen such that when the rubber insulation element is attached to the base body, there is always a gap between the surface configured as the contact portion of the insulation sections and the fixation material and/or the base body. This ensures that there is always a layer of the adhesive material having a defined minimum thickness present between the fixation material and/or the base body and the contact portion. The shape of the rubber insulation element may include projections intended to directly abut against the base body to set a defined relative position between the rubber insulation element and the base body.

Preferably, the thickness of the adhesive material is in the range of from 0.05 mm to 1 mm, preferably from 0.1 mm to 0.5 mm and particular preferably from 0.2 mm to 0.3 mm.

Preferably, the adhesive is an epoxy adhesive, an acrylate adhesive, a polyurethane adhesive, or a silicone adhesive.

Preferably, a width of the contact portion is in the range of from 1 mm to 3 mm. This width ensures that in combination with typical materials for insulation elements a sufficient dielectric strength is provided for the part of the insulation section surrounding the conductor.

Accordingly, it is preferred to choose the material of the insulation element and its geometry, in particular a material thickness surrounding the conductor, such that a predetermined dielectric strength is achieved. Likewise, it is preferred to choose the adhesive material and the layer width and/or height of the layer formed by the adhesive material such that a predetermined dielectric strength is achieved. For example, the width of the material of the insulation element and/or the adhesive material surrounding the conductor is preferably chosen to be in the range of from 0.1 mm to 2 mm, more preferably from 0.2 mm to 1 mm.

The contact portions of the insulation element(s) are configured and arranged such that not the entire surface of the adhesive material facing towards the insulation element is contacted. Accordingly, a portion of the surface of the adhesive material remains open and allows any gasses such as air to leave the adhesive material and to enter the air channel.

Preferably, a width of the air channel is in the range of from 0.2 mm to 1 mm. For example, the width of the air channel is 0.5 mm. Preferably, a height of the air channel is in the range of from 0.2 mm to 1 mm. For example, the height of the air channel is 0.5 mm. These dimensions provide an air channel of sufficient size to allow any trapped gas such as air to escape from the adhesive material and provide a space to receive excess adhesive material.

Preferably, the insulation element comprises one insulation section for each electrical feedthrough and is formed as a single integral element. Alternatively, the electrical feedthrough assembly comprises one insulation element for each electrical feedthrough, wherein each insulation element has one insulation section.

Preferably, at least one of the insulation sections of the insulation element has a cylindrical portion comprising the conductor opening and extending along a part of the conductor. Preferably, the cylindrical portion has annular grooves and/or annular ribs, in particular on an outside facing wall, which may be used to provide a seal with a connector that may be attached to the conductor.

By means of the ridges or grooves, such a connector may be secured in place. Further, the ribs, ridges or grooves may provide a seal to prevent dirt or fluids from entering the space between the conductor and the cylindrical portion when a connector is attached. The ribs, rings, ridges and/or grooves can be arranged such that an annular ring or groove is formed. It is also possible to arrange set-in-rings over the outside facing wall of the cylindrical portions. Such a set-in-ring may, for example, be secured in a groove arranged in the outside facing wall of the extension portion.

Preferably, a top surface of the insulation sections is provided with an annular groove which surrounds the conductor opening. This groove further enlarges the creepage distance between the base body and the conductor.

Preferably, the conductor opening of each insulation section is configured to provide an airtight seal around the conductor. This ensures that no moisture or dirt can affect the contact between the adhesive and the conductor.

The feedthrough assembly may comprise additional insulation on a second opposite side of the base body. In such a case, this additional insulation may be configured in the same manner as the insulation element on the first side of the base body or may be configured differently. For example, it is possible to provide a single insulation element as a single integral element on the first side and one insulation element per conductor on the second side.

Preferably, the material of the base body is a metal. More preferably, the base body comprises as a material steel, especially stainless steel, most preferred structural steel, preferably microalloyed steel, most preferred structural steel in form of microalloyed steel. Microalloyed steel is a type of alloy steel that contains small amounts of alloying elements (0.05 to 0.15%), including niobium, vanadium, titanium, molybdenum, zirconium, boron and rare-earth metals. They are used to refine the grain microstructure or facilitate precipitation hardening. The yield strength of microalloyed steel is between 275 and 750 MPa without heat treatment. Weldability is good and can even be improved by reducing carbon content while maintaining strength. Fatigue life and wear resistance are superior to similar heat-treated steels. Cold-worked microalloyed steels do not require as much cold working to achieve the same strength as other carbon steel; this also leads to greater ductility. By using microalloyed steel as material, a high bending stiffness and strength could be provided.

In order to improve the resistance against high voltage flashovers, the edges of the through holes may be provided with a rounded edge or a chamfer. Such an arrangement reduces the occurrence of sharp edges and thus lowers the strength of an electrical field.

Preferably, the base body includes means for improving resistance against bending. These means are preferably selected from an elevated area, wherein the opening is located within the elevated area, and/or a pulled-up edge.

Such an elevated area may be a single area encompassing all openings of the base body. In an alternative embodiment, the base body could comprise several separated elevated areas, wherein each of the elevated areas encompasses a single one of the openings. The elevated area(s) may, for example be formed into a plate like precursor of the base body e.g. by means of a stamping process to form the base body.

The pulled-up edge and the base body may be configured as a single part or the pulled-up edge may be configured as a separate part, which could be joined with the base body by fusing. The advantage of the pulled-up edge to be a separate part is that production of both parts-base body and pulled up edge-could be organized separately.

However, in an alternative embodiment, the base body is reshaped in order to provide the pulled-up edge. Such a reshaping process could be e.g. stamping a plate like precursor element in order to form the base body.

Preferably, in embodiments wherein the base body comprises an elevated portion which surrounds and/or comprises the through openings of the electrical feedthroughs and in which the insulation element is placed onto the conductors at the side of the base body having said elevation, it is preferred that the insulation element comprises a skirt. This skirt is configured to surround at least a part of the side wall of the elevation such that an additional air channel is formed between said side wall and the surrounding skirt. This additional air channel allows any trapped air in the adhesive to escape while the skirt provides a barrier between a defined position of the adhesive and a sealing area of the base body. Any excess adhesive may then be trapped by the skirt so that the sealing area remains clean and free from the adhesive material.

The fixation material is preferably selected from a glass, a ceramic or a glass ceramic material. Preferably, the fixation material is a glass material so that a glass-to-metal seal (GTMS) is provided between the base body, the conductor and the fixation material.

Preferably, the base body, the least one conductor and the fixation material form a compression seal. Accordingly, a first coefficient of thermal expansion of the base body is preferably chosen to be larger than a second coefficient of thermal expansion of the fixation material. Preferably, for obtaining a compression seal, a difference between the first coefficient of thermal expansion is at least 2 ppm/K and more preferably the difference between the first coefficient of thermal expansion is at least 5 ppm/K. A third coefficient of thermal expansion of the conductor material is preferably chosen to be about equal to or less than the second coefficient of thermal expansion of the fixation material. Two coefficients of thermal expansion are considered to be about equal if the difference is less than 2 ppm/K.

Alternatively to a compression seal, the material of the base body, the fixation material and the conductor material may be chosen such that their respective coefficients of thermal expansion are about equal, wherein a difference of less than 2 ppm/K is considered to be about equal.

Preferably, the formed seal between the opening of the base body, the fixation material and the conductor is a hermetical seal. In particular a feedthrough having a He leakage rate of better than 1.10-7 mbar l/s, especially 1.10-8 mbar l/s for a pressure difference of 1 bar is considered to be hermetic.

Preferably, the base body comprises an adhesion area, preferably located within a pocket, with a roughness for bonding with the adhesive.

The rough area may, for example, be provided by a stamping or an embossing process for enhancing adhesion of the adhesive. The roughness can also be provided by a rolled textured sheet material or by a rolled texture with a stamping step by a tool. Due to the good adhesion a connection between the material of the base body and the adhesive is improved. Additionally or alternatively, structures such as tenons and/or pins and/or spigots can be provided within the adhesion area. Further, structures such as a ring embossing and/or ring shaped grooves can be formed to improve the adhesion. Such tenons can be formed from the sheet, eventually in form of a mushroom shaped head part. A ring embossing around the fixation material in which the conductor is fed through the base body would be possible. In any case by the structure of the surface of the base body within the adhesion area, the connection of adhesive to the base body can be improved. In addition or alternatively to structuring a part of the surface of the base body it is also conceivable to provide such structures on parts of the surface of the insulation element.

Preferably, a part of the surface of the base body is configured as a sealing area. In the sealing area, it is preferred that the surface of the base body is smooth and flat. In particular, it is preferred that within the sealing area the surface of the base body has a flatness of at least 0.1 mm, preferably at least 0.07 mm, most preferably from 0.01 mm to 0.07 mm. Such a smooth and/or flat area facilitates creating a good and tight seal. A surface roughness is preferably $R_z$ 10 μm or better.

Preferably, the base body of the feedthrough assembly comprises mounting means to facilitate attaching of the feedthrough assembly to a housing or housing part of a device, such as an electric compressor. Preferably, the mounting means are configured as attachment bores or screw bores, wherein the base body preferably comprises at least two of said bores. The base body may additionally or alternatively comprise centering means such as protrusions or indentations to facilitate exact placement of the base body and thus of the feedthrough assembly with respect to a housing or part of a housing of a device.

The base body may be configured to have an elongated shape in which all the openings for the conductors are arranged along a line. However, other configurations, for example a round base body where the openings are evenly distributed along a circle, are also possible.

It is preferred that the fixation material is arranged such that the fixation material does not extend beyond the at least one opening in the base body, at least on the side facing towards the insulation element. In particular, a glass meniscus surrounding the conductor and extending beyond the base body should be avoided. In such an arrangement, the fixation material can be arranged flush with the surface of the opening or may be recessed relatively to the surface of the opening.

Arranging the fixation material such that it does not extend beyond the base body allows bending of the conductors without damaging the fixation material. For example, when a glass material is used as fixation material, a formed glass meniscus surrounding the conductor and extending beyond the opening would be subject to strong forces when the conductor is bent which could lead to cracks or damages to the glass. Thus, the proposed arrangement of the fixation material allows bending of the conductors as required. Further, the shape of such a glass meniscus is subject to strong variation making it difficult to determine the correct amount of adhesive.

Alternatively, the fixation material may be arranged such that the fixation material fills the opening and extends onto the base body in an area surrounding the opening, wherein the fixation material is preferably free from a glass meniscus surrounding the conductor. In such a configuration, the fixation material covering a part of the base bodies surface serves as an additional electrical insulation.

The insulation element is preferably made from a resilient material, in particular a natural or synthetic rubber, in particular a fluoroelastomer, an ethylene propylene diene monomer (EPDM) rubber, a hydrogenated nitrile-butadiene rubber (HNBR) or a silicone rubber.

Further suitable materials for the insulation element include thermoplastic or thermosetting plastic materials.

With respect to a housing of an electrical compressor, to which the electrical feedthrough assembly may be attached, the insulation element may be arranged on the side facing towards the outside of the housing. Additionally or alternatively, the insulation element may be arranged on the side facing towards the inside of the housing. In particular, the assembly may comprise two insulation elements, one arranged on the outside facing side and one on the inside facing side.

For example, when the proposed electrical feedthrough assembly is connected to a housing of an electric compressor, it is preferred to use a silicone rubber for an insulation element on the side of the assembly facing towards the inverter. For insulation elements facing towards the motor side, it is preferred to use a HNBR rubber.

Preferably, the electrical feedthrough assembly is configured as an e-compressor terminal, wherein the base body is configured for attachment to a housing of an e-compressor.

A method for manufacturing of an electrical feedthrough assembly as described herein is also disclosed. The method comprising the steps of

- providing of a base body assembly, the base body assembly comprising a base body having at least one conductor embedded in fixation material that is fed through an opening of the base body providing a glass-to-metal seal (GTMS),
- providing of an insulation element,
- coating of an adhesive area of the base body assembly and/or of a contact portion of the insulation element with an adhesive and placing of the insulation element onto the base body assembly such that the conductors are fed through conductor openings of respective insulation sections of the insulation element, wherein the insulation element is configured such that air channels are formed around each of the contact portions.

Optionally, the further insulation element may be arranged on the opposite side of the base body by turning the base body and repeating the respective assembly steps.

The electrical feedthrough assembly described herein is particularly suited for use as a connection terminal for an electric compressor. The feedthrough assembly may be configured as part of a housing of the electric compressor or may be attached to a housing or a part of a housing for an electric compressor.

Accordingly, it is a further aspect of the invention to provide an electric compressor comprising one of the electrical feedthrough assemblies described herein.

It is to be understood that the features mentioned above and those to be explained below can be used not only in the combination indicated in each case, but also in other combinations or alone, without leaving the scope of the present invention.

Preferred embodiments of the invention are shown in the figures and will be explained in more detail in the following description, wherein identical reference signs refer to identical or similar components or elements.

DETAILED DESCRIPTION OF THE INVENTION

Figure 1A:
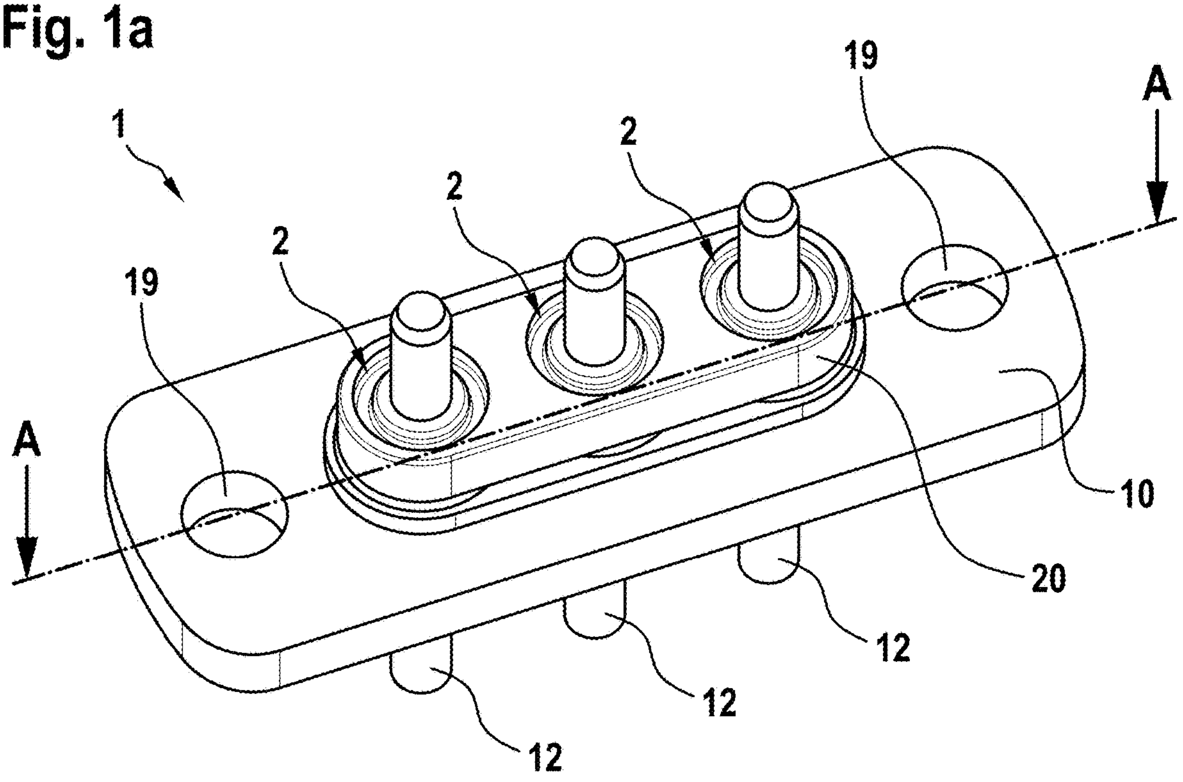
FIG. 1*a* shows a first example embodiment of a feedthrough assembly comprising a base body and an insulation element in a perspective view.

FIG. 1*a* shows a first exemplary embodiment of a feedthrough assembly 1 in a perspective view. The feedthrough assembly 1 comprises in the depicted example three electrical feedthroughs 2. Each of the electrical feedthroughs 2 has an opening 14 (see FIG. 1*b*) within a base body 10 and a conductor 12 which is fed through the respective opening 14. A fixation material 16 (see FIG. 1*b*) fixes the conductor 12 and seals the opening 14.

The base body 10 comprises in the depicted example two bore holes 19 for attaching of the feedthrough assembly 1 to a housing (not shown).

Figure 1B:
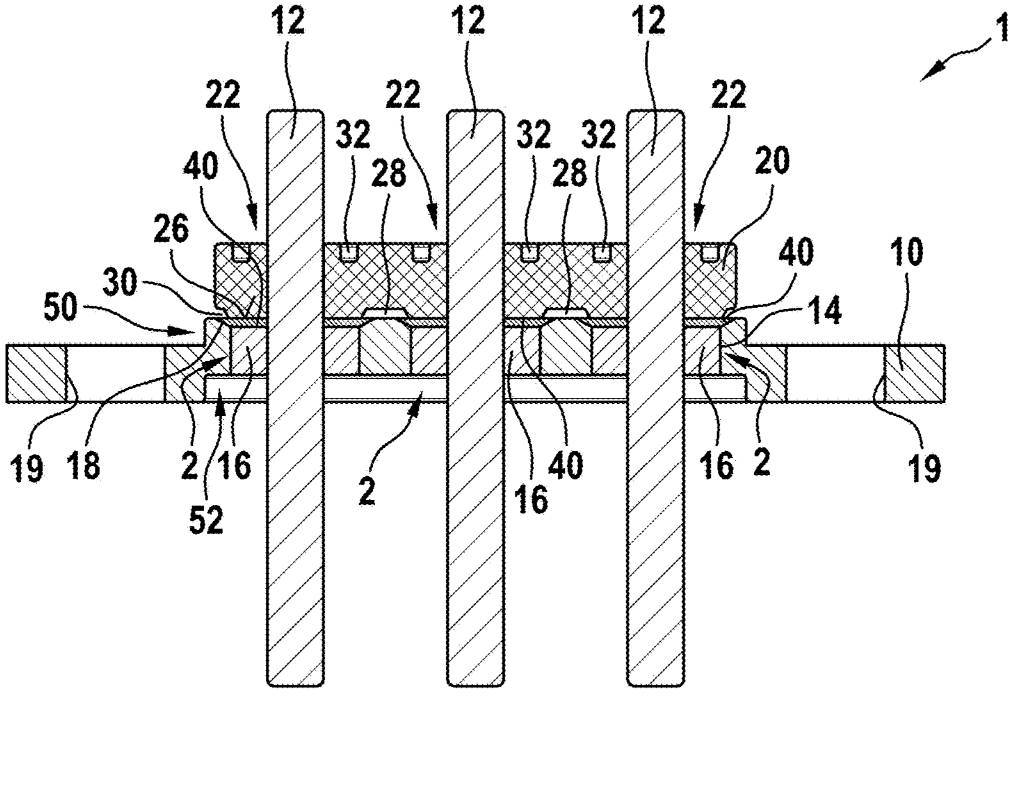
FIG. 1*b* shows the embodiment of the feedthrough assembly of FIG. 1*a* in a cross-sectional side view.

The feedthrough assembly 1 additionally comprises an insulation element 20 for enhancing the electrical insulation which is further described with respect to FIG. 1*b*.

FIG. 1*b* shows the feedthrough assembly 1 of FIG. 1*a* in a cross-sectional view along the line marked with A-A in FIG. 1*a*.

As can be seen in the cross-section views of FIG. 1*b*, each of the three conductors 12 is fed through an opening 14 in the base body 10 and is held by a fixation material 16. The fixation material 16 is, for example, selected from a glass and is electrically insulating. Further, the fixation material 16 is arranged such that it does not protrude beyond the opening 14. In particular, the fixation material 16 does not form a glass meniscus surrounding the conductor 12 and extending beyond the base body 10. In the embodiment of FIGS. 1*a* and 1*b*, the base body 10 has an elongated shape in which the three openings 14 are arranged along a line. Other configurations, for example where the openings 14 are evenly distributed along a circle, are also possible.

The fixation material 16 is, for example, selected from a glass material and is configured and arranged such that the respective opening 14 is sealed. In the example depicted in FIG. 1*b*, the fixation material 16 is further arranged such that it does not protrude from the opening 14. In particular, no glass meniscus surrounding the conductor 12 is formed.

In order to further improve an electrical insulation between the base body 10 and the conductors 12, an insulation element 20 is provided. In the exemplary embodiment of FIGS. 1*a* and 1*b*, the insulation element 20 is attached to a upper side of the base body 10. However, the insulation element 20 could also be arranged on a bottom side of the base body 10 and it is also possible to provide two insulation elements 20, one attached to the bottom side, and one attached to the top side of the base body 10.

The insulation element 20 comprises in the shown exemplary embodiment three insulation sections 22, one for each of the feedthroughs 2 and their respective conductors 12. Each of the insulation sections 22 has a conductor opening through which the respective conductor 12 is fed and each insulation section 22 forms a seal with the respective conductor 12. Further, the insulation sections 22 of the first embodiment have a common top wall comprising a groove 32 to further increase a creepage distance between two neighboring conductors 12.

For attachment of the insulation element 20 to the base body 10 and the fixation material 16, an adhesive material 40 is used. The base body 10 and the fixation material 16 form pockets 18, wherein every insulation section 22 has a projection 30 facing towards the respective pocket 18. The adhesive material 40 is received in the pockets 18 and is in direct contact with contact surfaces 26 of the respective projections 30 of the insulation sections 22. As the fixation material 16 is essentially flat and does not form a glass meniscus, an essentially flat surface of the fixation material 16 is provided which transitions to the side wall of the pocket 18 provided by the base body 10 without any steps or gaps.

Air channels 28 are formed surrounding the projections 30 and thus the conductors 12. A side wall of the air channels 28 is defined by side walls of the projections 30 and recessed areas of the insulation element 20 define a top wall of the air channels 28. The contact surfaces 26 of the insulation sections 22 are configured and arranged so that they do not cover the entire surface of the adhesive material 40 facing towards the insulation element 20. A portion of the surface of the adhesive material 40 remains uncovered and allows gasses such as air to escape from the adhesive material 40 and to enter the air channels 28. The air channels 28 are also open to the surrounding environment of the electrical feedthrough assembly 1 so that any gas or air can escape. This allows the adhesive material 40 to form an essentially gapless and bubble free layer.

For improving the resistance of the base body 10 against deflection or bending, the base body 10 comprises an elevated area 50 on the upper side and a corresponding recessed area 52 on the bottom side of the base body 10. The elevated area 50 in the depicted example is configured as a single elevated area 50 and all electrical feedthroughs 2 are arranged on said elevated area 50. Alternatively, the base body 10 could comprise one elevated area 50 for each of the electrical feedthroughs 2.

Figure 2A:
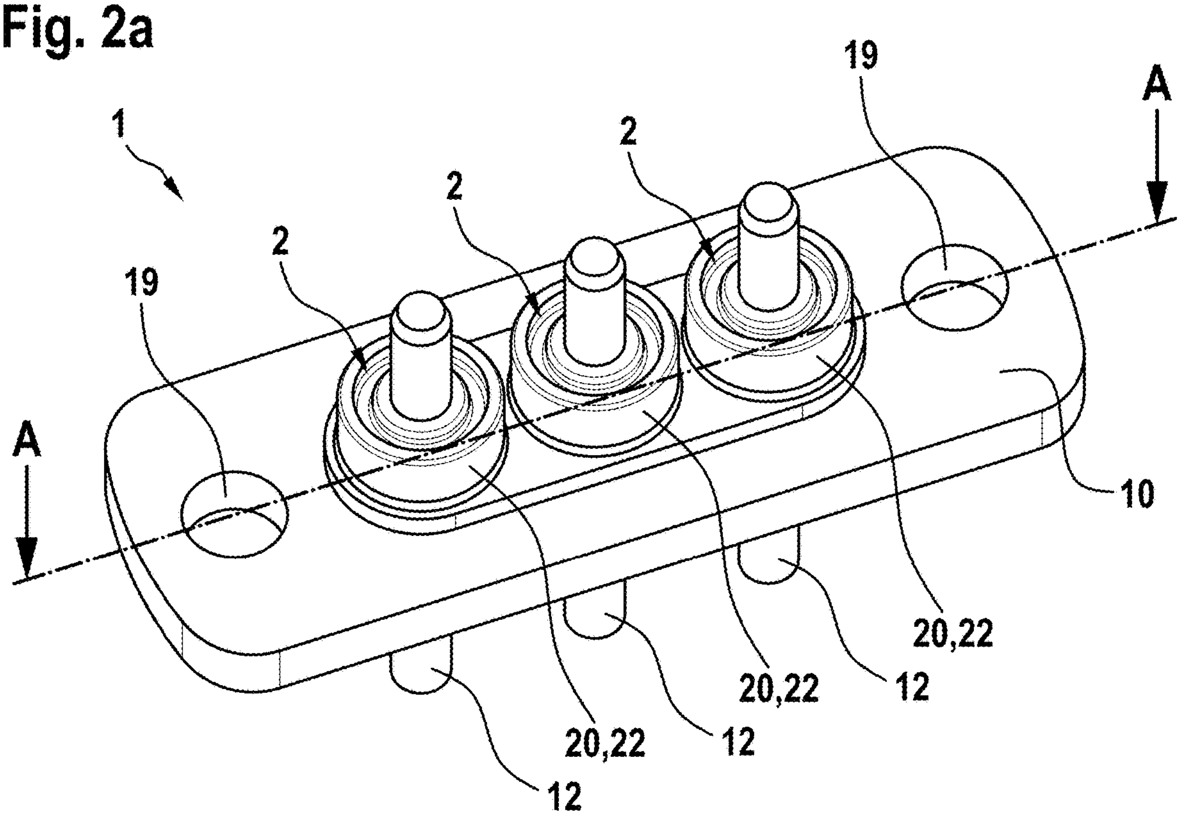
FIG. 2*a* shows a second embodiment of a feedthrough assembly comprising a base body and an insulation element in a perspective view.

FIG. 2*a* shows a second exemplary embodiment of a feedthrough assembly 1 in a perspective view. The feedthrough assembly 1 comprises in the depicted example three electrical feedthroughs 2. Each of the electrical feedthroughs 2 has an opening 14 (see FIG. 2*b*) within a base body 10 and a conductor 12 which is fed through the respective opening 14. A fixation material 16 (see FIG. 2*b*) fixes the conductor 12 and seals the opening 14.

The base body 10 comprises in the depicted example two bore holes 19 for attaching of the feedthrough assembly 1 to a housing (not shown).

The feedthrough assembly 1 additionally comprises three insulation elements for enhancing the electrical insulation-one insulation element 20 for each of the electrical feedthroughs 2. The insulation elements 20 are further described with respect to FIG. 2*b*.

Figure 2B:
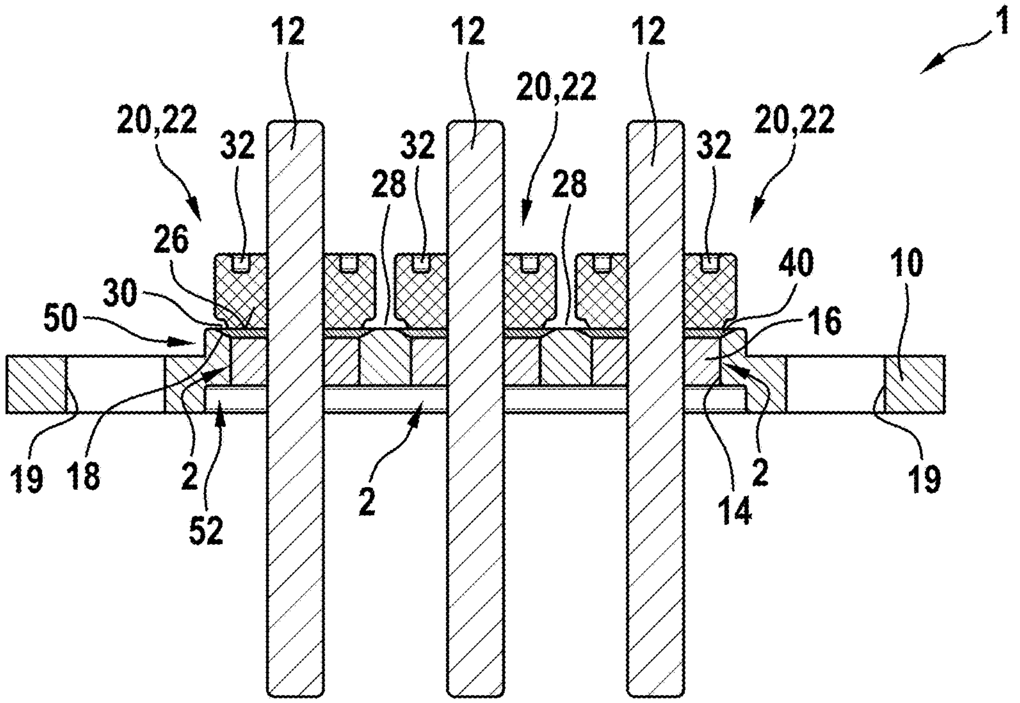
FIG. 2*b* shows the second embodiment of the feedthrough assembly of FIG. 2*a* in a cross-sectional side view.

FIG. 2*b* shows the feedthrough assembly 1 of FIG. 2*a* in a cross-sectional view along the line marked with A-A in FIG. 2*a*. The feedthrough assembly 1 of the second exemplary embodiment is similar to the first exemplary embodiment described with respect to FIGS. 1*a* and 1*b* except for the configuration of the insulation elements 20. Instead of a single insulation element 20 having three insulation sections 22, the second exemplary embodiment of FIGS. 2*a* and 2*b* comprises three insulation elements 20, wherein each of the insulation elements 20 has a single insulation section 22.

The insulation section 22 of each insulation element 20 has a conductor opening through which the respective conductor 12 is fed and each insulation section 22 forms a seal with the respective conductor 12. Further, the top wall of the insulation sections 22 comprises a groove 32 to further increase a creepage distance between two neighboring conductors 12 and between a conductor 12 and the base body 10.

For attachment of the insulation elements 20 to the base body 10 and the fixation material 16, an adhesive material 40 is used. The base body 10 and the fixation material 16 form pockets 18, wherein the insulation section 22 of each insulation element 20 has a projection 30 facing the respective pocket 18. The adhesive material 40 is received in the pockets 18 and is in direct contact with contact surfaces 26 of the respective projections 30 of the insulation sections 22.

Air channels 28 are formed surrounding the projections 30 and thus the conductors 12. A side wall of the air channels 28 is defined by side walls of the projections 30 and recessed areas of the insulation elements 20 define the top walls of the air channels 28. The contact surfaces 26 of the insulation sections 22 are configured and arranged so that they do not cover the entire surface of the adhesive material 40 facing towards the insulation element 20. A portion of the surface of the adhesive material 40 remains uncovered and allows gasses such as air to escape from the adhesive material 40 and to enter the air channels 28. The air channels 28 are also open to the surrounding environment of the electrical feedthrough assembly 1 so that any gas or air can escape. This allows the adhesive material 40 to form an essentially gapless and bubble free layer.

Figure 3:
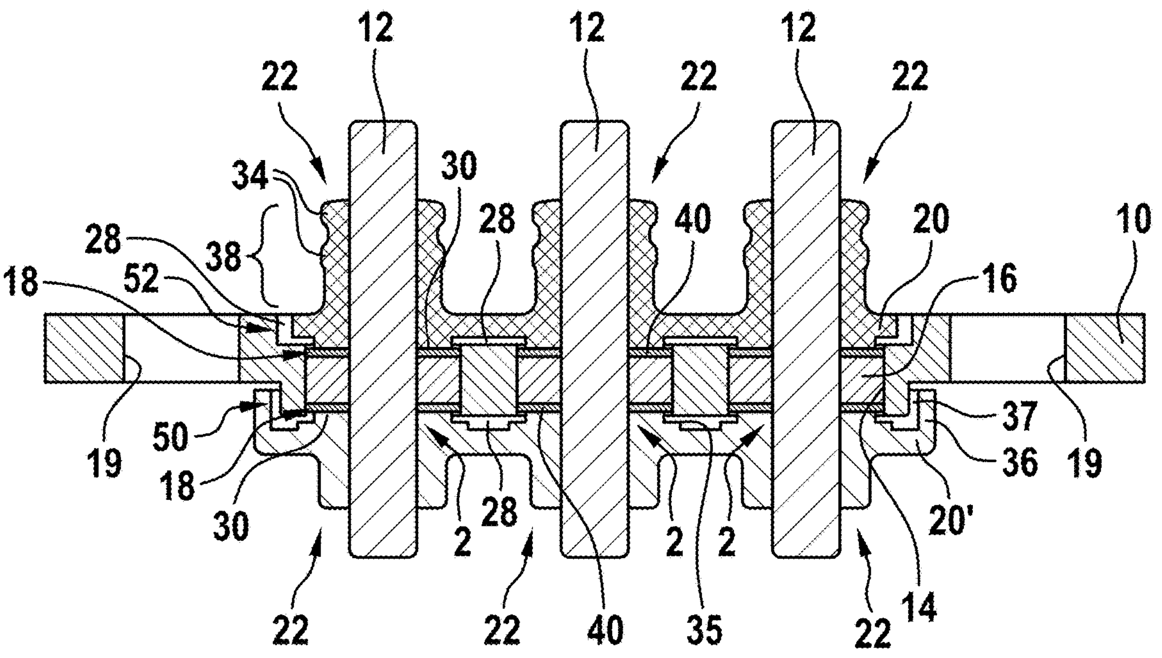
FIG. 3 shows a third embodiment of the feedthrough assembly in a cross-sectional side view.

FIG. 3 shows a third exemplary embodiment of the feedthrough assembly 1 in a cross-sectional side view. Similar to the embodiment described with respect to FIGS. 1*a* and 1*b*, the electrical feedthrough assembly 1 comprises three electrical feedthroughs 2, each having an opening 14 in a base body 10 through which a conductor 12 is fed. A fixation material 16 seals the respective opening 14 and holds the conductor 12.

In this third exemplary embodiment, the electrical feedthrough assembly 1 comprises two insulation elements 20, 20'. One insulation element 20 is arranged on a top side of the base body 10 and a further insulation element 20' is arranged on a bottom side of the base body 10.

For improving the mechanical stability of the base body 10, the base body 10 is provided with a recessed area 52 and a corresponding elevated area 50. The three electrical feedthroughs 50 are arranged within said recessed area 52 and the corresponding elevated area 50.

The insulation element 20 arranged on the upper side is configured as a single insulation element 20 having three insulation sections 22. Each insulation section 22 has a projection 30 defining a contact portion 26 which is in direct contact with the adhesive material 40. Side walls of the projection 30 define side walls of air channels 28 and recessed parts of the insulation element 20 define top walls of the air channels 28. Further, each insulation section 22 comprises a cylindrical section 38 which extends along the respective conductor 12 and forms a seal between the conductor 12 and the insulation section 22. In the example shown in FIG. 3, the cylindrical sections 38 are provided with ribs 34 which may be used for creating a seal between the insulation section 22 and a connector (not shown) attached to the respective conductor 12.

The further insulation element 20' arranged on the bottom side is in this example also configured as a single insulation element having three insulation sections 22. Each insulation section 22 has a projection 30 defining a contact portion 26 which is in direct contact with the adhesive material 40. Side walls of the projection 30 define side walls of air channels 28 and recessed parts of the further insulation element 20 define top walls of the air channels 28. For increasing the height of the air channels 28, the insulation sections 22 of the further insulation element 20' comprises a step 25. Further, each insulation section 22 comprises a cylindrical section 38 which extends along the respective conductor 12 and forms a seal between the conductor 12 and the insulation section 22.

In the example depicted in FIG. 3, the fixation material 16 is not flush with a surface of the openings 14 but is recessed and thus forms pockets 18 for receiving the adhesive material 40. Any excess adhesive material 40 can be contained inside said pockets 18. In case of the further insulation element 20', a skirt 36 is provided which surrounds the elevated area 50 and creates a further air channel 37. The skirt 36 serves as a further measure to contain excess adhesive material 40 while still allowing any gas or trapped air to escape to the surrounding environment.

Figure 4:
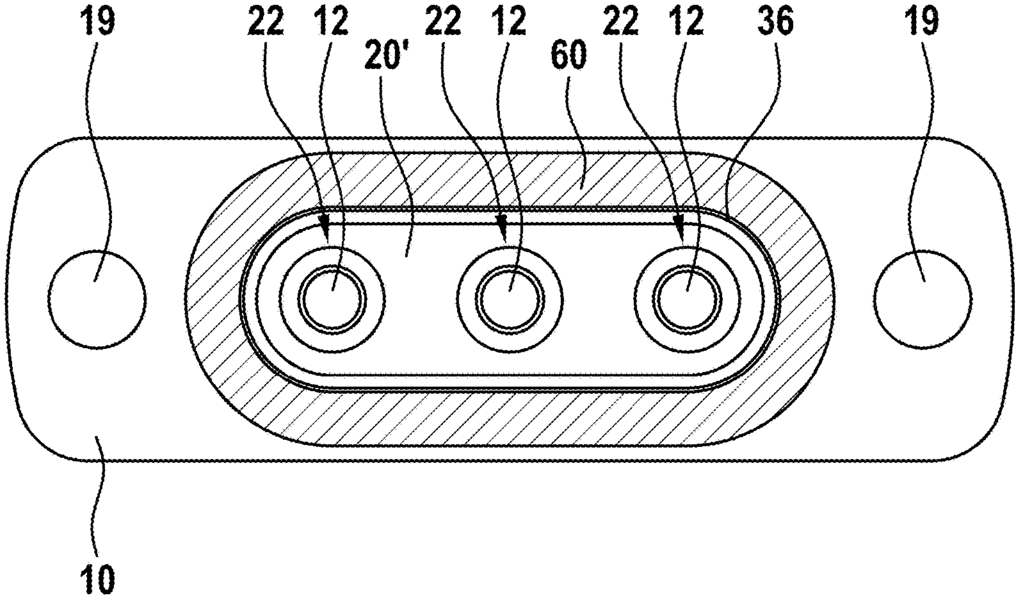
FIG. 4 shows the third embodiment of the feedthrough assembly in a bottom view.

FIG. 4 shows the third embodiment of the electrical feedthrough assembly 1 in a bottom view. The skirt 36 of the further insulation element 20' completely surrounds the elevated area 50 and serves as an additional barrier to prevent any excess adhesive material 40 from overflowing onto a sealing area 60. The sealing area 60 may be used to create a seal between the electrical feedthrough assembly 1 and a housing to which the electrical feedthrough assembly 1 is attached, for example by means of an O-ring.

Although the present invention has been described with reference to preferred examples of embodiments, it is not limited thereto but can be modified in a variety of ways.

LIST OF REFERENCE NUMERALS

1 electrical feedthrough assembly
2 electrical feedthrough
10 base body
12 conductor
14 opening
16 fixation material
18 pocket
19 bore hole
20, 20' insulation element
22 insulation section
24 conductor opening
26 contact portion
28 air channel
30 projection
32 groove
34 rib
36 skirt
37 further air channel
38 cylindrical section
40 adhesive material
50 elevated area
52 recessed area
60 sealing area

The invention claimed is:

1. An electrical feedthrough assembly for an e-compressor, comprising a base body configured for attachment to a housing and comprising at least one electrical feedthrough, each electrical feedthrough comprising an opening in the base body for a conductor which is fed through the opening and embedded in a fixation material which seals the opening of the electrical feedthrough, wherein the electrical feedthrough assembly further comprises at least one insulation element being affixed to the base body by an adhesive material, wherein the at least one insulation element comprises at least one insulation section, wherein each electrical feedthrough has an assigned insulation section, each insulation section having a conductor opening through which the respective conductor is fed, the insulation element being configured and arranged such that a contact portion of each insulation section is in contact with the adhesive material, and for each insulation section an air channel is formed, a top wall of the air channel being formed by the insulation element, the air channel surrounding the contact portion of the respective insulation section.

2. The electrical feedthrough assembly of claim 1, wherein a pocket for the adhesive material is defined by the base body and the fixation material, wherein the opening is located within said pocket, and a contact portion of the insulation sections comprises a projection which extends into the pocket such that a gap between a side wall of the pocket and a side wall of the projection is formed, wherein the adhesive material at least partially fills said gap.

3. The electrical feedthrough assembly of claim 2, wherein the pocket and/or the projection has slanted side walls.

4. The electrical feedthrough assembly of claim 1, wherein the maximum thickness of the adhesive material is in the range of from 0.05 mm to 1 mm.

5. The electrical feedthrough assembly of claim 1, wherein a width of the contact portion is in the range of from 1 mm to 3 mm.

6. The electrical feedthrough assembly of claim 1, wherein a width of the air channel is in the range of from 0.2 mm to 1 mm and/or a height of the air channel is in the range of from 0.2 mm to 1 mm.

7. The electrical feedthrough assembly of claim 1, wherein the insulation element comprises one insulation section for each electrical feedthrough and is formed as a single integral element or the electrical feedthrough assembly comprises one insulation element for each electrical feedthrough, wherein each insulation element has one insulation section.

8. The electrical feedthrough assembly of claim 1, wherein the base body includes means for improving resistance against bending, the means being selected from an elevated area, wherein the opening is located within the elevated area; and/or a pulled-up edge.

9. The electrical feedthrough assembly of claim 1, wherein the base body, the at least one conductor and the fixation material form a compression seal.

10. The electrical feedthrough assembly of claim 1, wherein the base body comprises an adhesion area with a roughness for bonding with the adhesive.

11. The electrical feedthrough assembly of claim 10, wherein the adhesion area is located within a pocket.

12. The electrical feedthrough assembly of claim 1, wherein the fixation material does not extend beyond the at least one opening in the base body on the side facing towards the insulation element, or wherein the fixation material is flush with the opening, or wherein the fixation material extends onto the base body in an area surrounding the opening.

13. The electrical feedthrough assembly of claim 12, wherein the fixation material is free from a glass meniscus surrounding the conductor.

14. The electrical feedthrough assembly of claim 1, wherein the assembly comprises at least one further insulation element arranged on a side of the base body opposite of the at least one insulation element.

15. The electrical feedthrough assembly of claim 1, wherein the insulation element is made from a fluoroelastomer, an ethylene propylene diene monomer (EPDM) rubber, a hydrogenated nitrile-butadiene rubber (HNBR) or a silicone rubber.

16. The electrical feedthrough assembly of claim 1, wherein the electrical feedthrough assembly is configured as an e-compressor terminal, wherein the base body is configured for attachment to a housing of an e-compressor.

17. The electrical feedthrough assembly of claim 1, wherein the air channel completely surrounds the contact portion of the respective insulation section.

18. The electric compressor comprising an electrical feedthrough assembly of claim 1.

* * * * *